US011113303B2

(12) United States Patent
Tran et al.

(10) Patent No.: US 11,113,303 B2
(45) Date of Patent: Sep. 7, 2021

(54) OWNERSHIP TRANSFER OF DATABASE ARTIFACTS BETWEEN FILES

(71) Applicant: SAP SE, Walldorf (DE)

(72) Inventors: Le-Huan Stefan Tran, Wiesloch (DE); Arne Harren, Walldorf (DE); Jonathan Bregler, Kraichtal (DE); Alexander Bunte, Heidelberg (DE); Andreas Kellner, Birkenau (DE); Daniel Kuntze, Bruchsal (DE); Vladislav Leonkev, Walldorf (DE); Simon Lueders, Walldorf (DE); Volker Sauermann, Dossenheim (DE); Michael Schnaubelt, Leimen (DE)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 15/222,040

(22) Filed: Jul. 28, 2016

(65) Prior Publication Data
US 2017/0322991 A1 Nov. 9, 2017

Related U.S. Application Data

(60) Provisional application No. 62/333,439, filed on May 9, 2016.

(51) Int. Cl.
G06F 16/25 (2019.01)
G06F 16/21 (2019.01)
G06F 16/2455 (2019.01)
G06F 21/62 (2013.01)

(52) U.S. Cl.
CPC ............ *G06F 16/258* (2019.01); *G06F 16/21* (2019.01); *G06F 16/214* (2019.01); *G06F 16/24554* (2019.01); *G06F 21/6218* (2013.01)

(58) Field of Classification Search
CPC ...... G06F 16/248; G06F 16/21; G06F 16/211; G06F 16/214
See application file for complete search history.

(56) References Cited

U.S. PATENT DOCUMENTS

2004/0210607 A1* 10/2004 Manchanda .......... G06F 16/283
2008/0256432 A1* 10/2008 Sambandam .......... G06Q 10/00
715/212

(Continued)

OTHER PUBLICATIONS

U.S. Appl. No. 14/949,256, filed Nov. 23, 2015.
(Continued)

*Primary Examiner* — Apu M Mofiz
*Assistant Examiner* — Cindy Nguyen
(74) *Attorney, Agent, or Firm* — Fish & Richardson P.C.

(57) ABSTRACT

A computer-implemented method for deploying a new artifact file in a database. The new artifact file provides specifications for one or more new run-time database objects to be created in the database by processing of the new artifact file by artifact-type specific conversion engines. The method includes assigning ownership of the one or more new run-time database objects to be created in the database to the new artifact file, and, when an existing database object in the database provided by another artifact file corresponds to a new run-time database object specified in the new artifact file, assigning ownership of the existing database object in the database to the new artifact file being deployed.

20 Claims, 8 Drawing Sheets

(56) References Cited

U.S. PATENT DOCUMENTS

| | | | |
|---|---|---|---|
| 2010/0313179 A1* | 12/2010 | Groves | G06F 8/34 717/101 |
| 2012/0078931 A1* | 3/2012 | Jaquette | H04N 21/2181 707/758 |
| 2012/0117321 A1* | 5/2012 | Watanabe | G06F 11/2092 711/113 |
| 2012/0198416 A1* | 8/2012 | Sirr | G06F 8/35 717/104 |
| 2014/0046936 A1* | 2/2014 | John | G06F 16/212 707/723 |
| 2014/0136257 A1* | 5/2014 | Amulu | G06Q 10/06311 705/7.15 |
| 2014/0180961 A1* | 6/2014 | Hankins | G06Q 10/10 705/348 |
| 2015/0169715 A1* | 6/2015 | Kanellos | G06F 16/254 707/602 |
| 2016/0063840 A1* | 3/2016 | Kumarasamy Mani | G06F 17/2288 340/540 |
| 2016/0315965 A1* | 10/2016 | Sastry | H04L 63/20 |

OTHER PUBLICATIONS

U.S. Appl. No. 14/948,990, filed Nov. 23, 2015.
U.S. Appl. No. 14/949,189, filed Nov. 23, 2015.
U.S. Appl. No. 14/949,128, filed Nov. 23, 2015.

* cited by examiner

800

```
┌─────────────────────────────────────────────────┐
│ Assigning ownership of the one or more new      │
│ run-time database objects to be created in the  │
│ database to the new artifact file               │
│                     810                         │
└─────────────────────────────────────────────────┘
                        ↓
┌─────────────────────────────────────────────────┐
│ When an existing database object in the         │
│ database provided by another artifact file      │
│ corresponds to a new run-time database object   │
│ specified in the new artifact file, assigning   │
│ ownership of the existing database object in    │
│ the database to the new artifact file being     │
│ deployed                                        │
│                     820                         │
└─────────────────────────────────────────────────┘
                        ↓
┌─────────────────────────────────────────────────┐
│ When processing of the new artifact file by     │
│ artifact-type specific conversion engines to    │
│ create one or more new run-time database        │
│ objects in the database, excluding creation a   │
│ new run-time database object corresponding to   │
│ the existing database object whose ownership    │
│ is now assigned to the new artifact file being  │
│ deployed                                        │
│                     830                         │
└─────────────────────────────────────────────────┘

┌─────────────────────────────────────────────────┐
│ Undeploying the another artifact file by        │
│ dropping one or more existing database objects  │
│ in the database provided by the another artifact│
│ file but keeping the existing database object   │
│ whose ownership is now assigned to the new      │
│ artifact file being deployed                    │
│                     840                         │
└─────────────────────────────────────────────────┘
```

FIG. 8

OWNERSHIP TRANSFER OF DATABASE ARTIFACTS BETWEEN FILES

CROSS-REFERENCE TO RELATED APPLICATIONS

This application is a non-provisional of, and claims priority to, U.S. Provisional Application No. 62/333,439 filed May 9, 2016, entitled DATABASE DEPLOYMENT CONTAINERS, the disclosure of which is incorporated by reference herein in its entirety.

BACKGROUND

In the context of computers and computer programs (e.g., applications) that are used in information technology, a database is an organized or structured collection of data (values). The data in the database may include data describing instances of database objects (e.g., tables, queries, reports, views and other objects) and may include schemas describing the types or structures of the database objects.

Large database systems (e.g., enterprise resource planning ("ERP") systems and customer relationship management ("CRM") systems) can include database objects that store and organize data, as well as database objects for accessing the data. For example, in some database systems a database object may include a table, an index, and a view, as well as a procedure for accessing one or more tables, a procedure importing data into one or more tables, or a calculation view procedure that manipulates the data in one or more tables. Pushing down data-intensive computations into the database layer minimizes data transfers between the database layer and an application layer and takes advantage of in-memory capabilities, which are becoming more common. Because the database objects of such a system include procedures and other objects for manipulating the data, an application developer may himself or herself develop some of the database objects, for example, by developing design-time artifacts that are deployed to the database as run-time database objects.

"Artifacts," as the term is often used in the context of software development, may be understood to refer to data models, workflow diagrams, test matrices and plans, setup scripts, use cases, class diagrams, UML models, requirements, design documents or other documents, which help describe the function, architecture, and design of a software product (e.g., a database object). In some instances, the term database "artifacts" may be used to refer to the software product itself (e.g., the database object itself).

A database management system (DBMS) may provide access to data in the database. The DBMS may provide various functions that allow entry, storage, and retrieval of information and provide ways to manage how that information is organized in the database. The DBMS may be used to manage more than one database. Both the database and its DBMS may conform to the principles of a particular database model (e.g. hierarchical, relational, network, document, etc.). Often the term "database" is used to refer to both the database and the DBMS used to manipulate the database. Further, the term "database system" may be used to refer collectively to the database model, the database management system, and the database.

In some database systems, one or more of the database objects deployed in the database may be grouped or packaged in a so-called container (hereinafter—a database container or a run-time container). The database container may be a class, a data structure (or schema), or an abstract data type whose instances are collections of other objects. The database container may store objects in an organized way that follows specific access rules. For example, the database container may act as a sandbox to isolate database objects in the container from deployment and run-time errors of other database objects or containers in the database. Access to database container content may be controlled by database privileges, for example, by granting SELECT or EXECUTE privileges.

The present disclosure relates to managing a database with deployed database or run-time containers therein. In particular, the disclosure relates to deploying new run-time database objects in a database.

SUMMARY

A new artifact file provides specifications for one or more new run-time database objects to be created in a database by processing of the new artifact file by artifact-type specific conversion engines. A computer-implemented method for deploying a new artifact file in a database is described herein.

In general aspect, the method includes assigning ownership of the one or more new run-time database objects to be created in the database to the new artifact file. Further, when an existing database object in the database provided by another artifact file corresponds to a new run-time database object specified in the new artifact file, the method includes assigning ownership of the existing database object in the database to the new artifact file being deployed.

In an aspect, processing of the new artifact file by artifact-type specific conversion engines to create one or more new run-time database objects in the database excludes creating a new run-time database object corresponding to the existing database object whose ownership is now assigned to the new artifact file being deployed. The existing database object whose ownership is now assigned to the new artifact file can be a database object having state.

In another aspect, the method includes undeploying the another artifact file by dropping one or more existing database objects in the database provided by the another artifact file but keeping the existing database object whose ownership is now assigned to the new artifact file being deployed.

In a further aspect, the new artifact file provides specifications for a new run-time database object having a dependency, the dependency corresponding to the existing database object provided by the another artifact file. Assigning ownership of the one or more new run-time database objects to be created in the database to the new artifact file includes recognition, by the new artifact file, of the dependency corresponding to the existing database object provided by the another artifact file.

The details of one or more implementations are set forth in the accompanying drawings and the description below. Further features of the disclosed subject matter, its nature and various advantages will be more apparent from the accompanying drawings, the following detailed description, and the claims.

BRIEF DESCRIPTION OF THE DRAWINGS

FIG. 8 is a flow chart illustrating an example method for deploying a new artifact file in a database, in accordance with the principles of the present disclosure.

DETAILED DESCRIPTION

Figure 1:
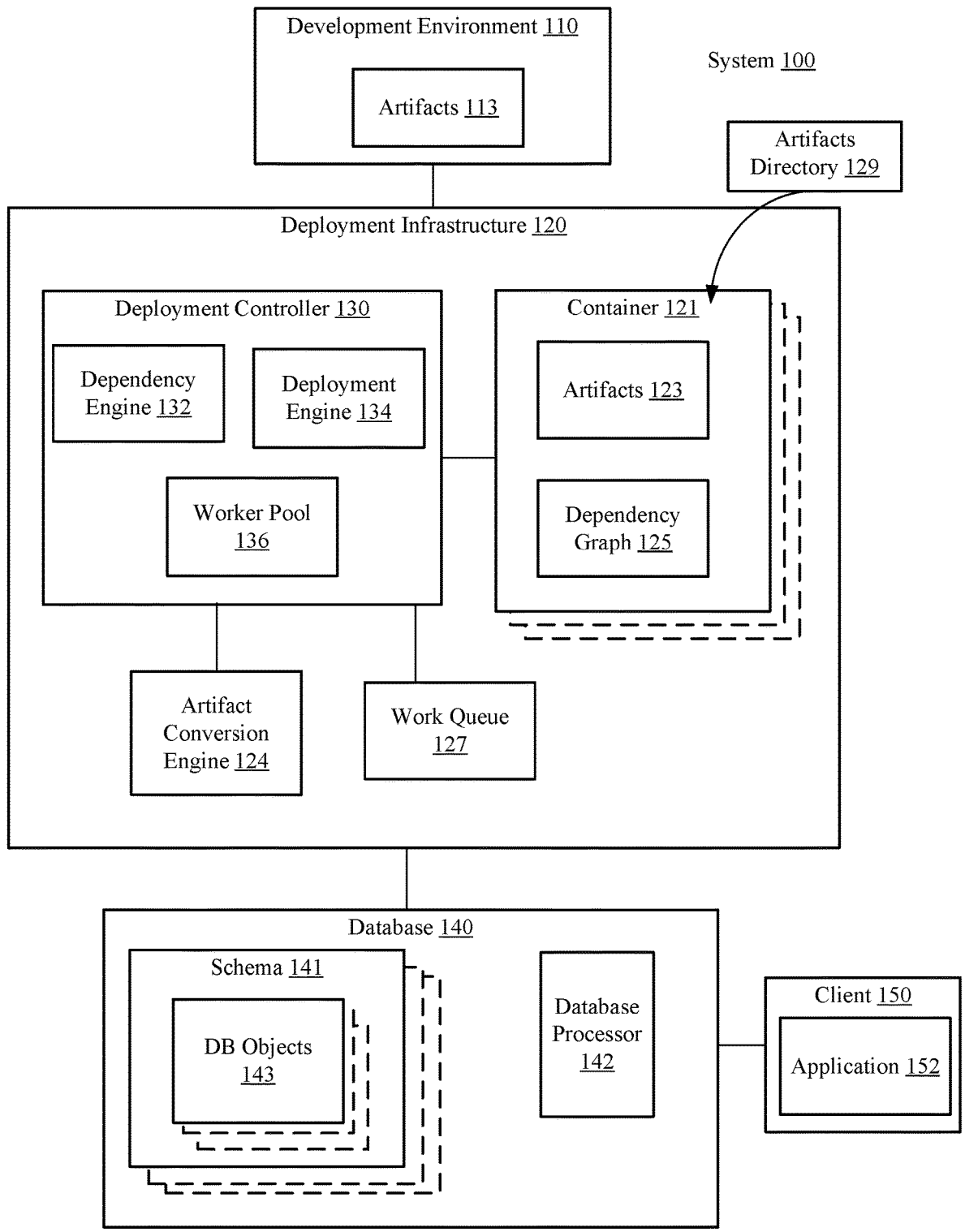
FIG. 1 is a block diagram illustration of an example system for deployment of database artifacts, in accordance with the principles of the present disclosure.

A deployment infrastructure system focuses on deployment aspects and addresses both development and modeling scenarios for a database. Implementations may handle development and modeling of database artifacts for deployment into the database as runtime database objects. Artifacts can include things like tables, views, indexes, core data services ("CDS"), calculation views, procedures and so forth. In some implementations, the deployment infrastructure system does not support non-database artifacts like JavaScript programs, OData artifacts, etc. Such artifacts can be handled by an application layer. An example of an application layer is extended services ("XSA") for a HANA database.

In some implementations, deployment of database objects via the deployment infrastructure is based on a container model, where each container corresponds to a database schema. Containers can be used for multiple deployments of the same database artifacts, and for development sandboxes. Containers may be isolated against each other by database means, e.g. each database schema with its deployed database objects is owned by a per-schema technical user. The technical user may be separate from a container owner to allow the separation of privileges for deployment and runtime access to deployed database objects. Thus, security aspects for deployment need only to consider technical users. A technical user can be for a specific container and may represent a user used by the deployment infrastructure 120 of FIG. 1, as discussed below, to communicate with database 140 of FIG. 1 and to deploy the artifacts as database objects into the database. A technical user is not a developer. Technical users decouple ownership from developers, i.e., the created database objects are owned by a technical user. Technical users may be used internally by the deployment infrastructure 120 and the database 140 of FIG. 1, as described below, and may be created as restricted database users, who do not have any default privileges. Thus, by default, cross-container access at the database level may not be possible; but can be granted via database privileges. In addition to the schema-based containers, the deployment infrastructure system may also use database schemata to isolate its metadata, for example, separating a definition of artifacts from the deployed database objects.

In some implementations, some database objects are written in a schema-free way, or in other words, without explicit schema references. This allows deployment of the same database objects into different containers because database objects reference other database objects only via object names without schema reference. The containers may be created by users who have the privilege to call a specific HANA DI SQL API function for creating a HANA DI container. Such a privilege can be granted by a database administrator. Database objects deployed using the HANA DI are deployed in a container. The database objects can be deployed by any user who has the privilege to call a specific HANA DI SQL API function of the desired container for deploying design-time artifacts. In such implementations, references to schema-external objects may be created via synonyms (or table links in case of Zero-Downtime Maintenance ("ZDM")) that are bound during deployment. The synonyms (or table links) provide schema-local names for the schema-external objects. Privileges on these schema-external objects can be explicitly granted to the container's technical user, e.g. SELECT-WITH-GRANT-OPTION privileges on schema-external ERP tables.

Deployment Infrastructure System

FIG. 1 illustrates a block diagram of an example deployment infrastructure system 100, according to disclosed implementations. The system 100 may be used to deploy design-time artifacts to create run-time objects that can be accessed by applications. The system 100 may include a database 140, a deployment infrastructure 120, and a development environment client 110. The development environment client 110 may include functionality from one or more development tools, such as a deployment infrastructure client, an extended services development infrastructure component, and an extended services deployment component. The development environment client 110 may be communicatively coupled with the deployment infrastructure 120. In some implementations, the development environment client 110 may access the deployment infrastructure 120 via a proxy (not shown) that insulates the deployment infrastructure 120 from direct access by the development environment client 110. In some implementations, the deployment infrastructure 120, the proxy, and the database 140 may be part of a database cluster. Deployment-related activities, such as staging of files, triggering of real deployment into a single container, etc., can be performed by a dedicated technical deployment user. As indicated above, the technical deployment user of the container can be different from the technical runtime user of the schema to allow separation of privileges for deployment and/or runtime access to the deployed database objects.

The development environment client 110 may enable the generation and maintenance (revision) of design-time artifacts 113 (also referred interchangeable as artifacts 113). The design-time artifacts 113 specify a definition of one or more database objects in a declarative way. In other words, the design-time artifacts 113 represent the target state of the database objects rather than using the imperative CREATE, ALTER, and DROP statements, which are conventionally used to generate database objects. The use of declarative statements for artifacts 113 not only enables the creation of run-time database objects, but also facilitates modeling a networked set of artifacts, such as tables, sequences, views, procedures, functions, data flows, etc. as design-time artifacts. In some implementations, not all artifacts have a one-to-one relationship to a SQL statement. For example, calculation views may result in multiple database objects and table data (e.g., a table import artifact) might be provided via CSV text files or even binary files which do not correspond to SQL. Thus, a single artifact may result in deployment of one or multiple database objects, and multiple artifacts can result in deployment of a single database object. The database objects deployed from an artifact may be controlled by the artifact conversion engine 124. The design-time artifacts 113 simplify a dependency-based deployment, re-deployment, and un-deployment, and facilitate lifecycle management aspects. For example, using design-time artifacts enables separation of the steps of 1) uploading the artifacts into deployment infrastructure (staging), and 2) deploying the artifacts to the database. Artifacts 113 also simplify incremental deployment because only modified design-time artifacts are uploaded and deployed rather than every artifact in the container.

When a developer or user of the deployment infrastructure is ready to deploy the design-time artifacts 113 from the development environment 110 to the deployment infrastructure 120, the developer or user of the deployment infrastructure may create a container 121 for the artifacts to reside in. A container 121 represents a database schema 141 in the database 140 and is a work space that can be owned and accessed by a single user or a group of users (e.g., a single developer or a group of developers). The container 121 includes container metadata, such as companion containers (i.e., companion schemata), technical users authorized to access the schema, etc. Companion containers are other containers that have database artifacts the container wants to access. A synonym in the container 121 enables the container 121 to access artifacts in the other container, i.e., the companion container. Metadata for a container 121 may, thus, identify run-time user privileges (e.g., for technical users of other containers), a container owner, or dependencies between design-time artifacts.

In some implementations, database objects are deployed in schema 141, which corresponds to a container. Thus, each container 121 has a corresponding schema 141. Each container 121 also may include other components such as a metadata schema, which may contain items such as a version number. In some implementations, a single deployment only operates on a single container 121 and the container boundary is a deployment boundary. In other words, affected database objects 143 inside other database schemata 141 (e.g., schemata that do not correspond with the container being deployed) are not re-deployed and deployment does not fail if database objects inside other schemata break. The container-based deployment of the deployment infrastructure system 100 enables the system to use transactional deployment. In other words, the deployment infrastructure system 100 may perform deployment modification of database objects 143, including DDL and DML operations and all re-deployments of affected objects, inside a single database transaction. In some implementations, sub-transactions do not exist. In other implementations, sub-transactions may be used for further optimization, e.g., to commit some parts of the deployment. Thus, the system 100 does not need compensation actions in case of rollbacks because these are handled by the database as part of the transaction management. As indicated above, some database objects 143 may be deployed outside of a schema 141, e.g., ERP objects that are created beforehand outside the container schema, i.e., in the "PUBLIC" schema, and not deployed using the container.

The user creating the container 121 may upload the artifacts 113 from the development environment 110 to the deployment infrastructure 120, which adds artifacts 123 to the container 121. Once the database artifacts 123 are loaded into the container 121, a user may begin the deployment of these artifacts 123 within that container 121. In some implementations, the deployment may be initiated via a make or deployment process. The deployment process may be directed by a deployment controller 130 of the deployment infrastructure 120. The deployment controller 130 may be instructions stored in one or more memories that, when executed by one or more processors formed in a substrate, cause the deployment infrastructure to perform certain operations. The deployment controller 130 may include one or more engines, which also may be referred to as "build plug-ins", that take the artifacts 123 in the container 121, determine dependencies for the artifacts 123, determine an order of deployment for the artifacts 123, and initiate generation of appropriate schema 141 and database objects 143 in accordance with existing authorization and syntactical requirements. In other words, the deployment controller 130 accomplishes deployment of the artifacts 123 in the container 121 in an automatic and transactional manner, providing error messages as appropriate, and eliminating the need for any user to manually determine the proper order of deployment for the artifacts 123.

In some implementations, the deployment controller 130 may include a dependency engine 132. The dependency engine 132 may oversee generation of a dependency graph 125 for the artifacts 123 in the container 121. The dependency graph 125 represents a proper order of deployment for the artifacts 123. In the dependency graph 125, a root node may be an artifact that is itself not dependent on any other artifact. It is possible for the dependency graph 125 to have multiple root nodes. Dependency engine 132 may generate the dependency graph 125 by generating a node for each artifact 123 in the container 121 and extracting dependency information from the declarative statements in the artifacts 123 themselves. In some implementations, the dependency engine 132 may update the dependency graph 125 by adding additional dependency edges, also referred to as push-forward edges. In some implementations, such additional push-forward edges may be added by an artifact conversion engine 124. In some implementations, the dependency engine 132 may build the dependency graph 125 via an expand phase, a precompile phase, a merge phase, and a build phase. In the expand phase, the system may expand complex objects into separate artifacts. In the precompile stage, the system may determine dependencies in each artifact. In the merge phase, the system may merge separate artifacts into one object (e.g., merging an optional synonym configuration artifact and a synonym artifact into a synonym artifact with an explicit configuration, and in the build phase, the system may build the dependency graph with the backward edge count and push-forward edges. Deployment of the artifacts may take place during a walk-graph stage. In some implementations, each stage can utilize parallel processing.

The deployment controller 130 also may include a deployment engine 134. The deployment engine 134 may direct the deployment of artifacts 123 to database objects 143 using the dependency graph 125. The deployment controller 130 may use the dependency graph 125 to calculate the order in which the database objects need to be created, and to detect missing and/or required objects, as well as to find and report attempted unauthorized access of artifacts outside the container (e.g., via synonyms). In addition, the deployment engine 134 may use dependencies to re-deploy database objects that are affected by newly deployed or modified objects.

The deployment controller 130 (e.g., the dependency engine 132 and deployment engine 134) may work with an artifact conversion engine 124 in deployment of artifacts 123. In some implementations, the interpretation of artifacts including the extraction of dependencies and the steps taken to implement a target-state-based deployment of the artifacts is done by the artifact conversion engine 124, which includes deployment directives for each artifact type. In other words, the artifact conversion engine 124 may be formed from instructions, e.g., a build plugin, for a table artifact type, a plugin for a view artifact type, a plugin for a table import artifact type, etc. The plug-ins may be different files, different procedures, or just different portions of the artifact conversion engine 124. Each build plug-in may be a program or piece of code that execute the various build phases (precompile, merge, and expand) and transform a design-time artifact into a run-time database object. In some implementations, an application developer may provide the plug-in for an artifact type. In some implementations, the artifact conversion engine 124 may have access to a deployment container 121 via a SQL-based API only. Commands that the artifact conversion engine 124 needs for creating/altering/dropping a database object may be available at the SQL layer of the database 140. These SQL commands may take the database security constraints into account. In transactional deployment, the DDL and DML, statements may run inside a single database transaction in non-auto-commit mode. In some implementations, the database 140 may be insulated from the artifact conversion engine 124. For example, the artifact conversion engine 124 may issue commands via the deployment controller 130 to the database 140 rather than directly to the database 140. Such implementations insulate the database 140 from the artifact conversion engine 124 by having the deployment controller 130 (or another controller, such as database processor 142) check commands for authentication or syntax errors prior to executing the commands.

In some implementations, the deployment controller 130 may improve the functioning of the system 100 by using parallel processing to deploy the artifacts 123. In other words, the deployment controller 130 may improve the processing of the system 100 by speeding up the deployment of the artifacts 123. When the container 121 includes hundreds or thousands or artifacts 123, parallel processing may result in a substantial reduction in the deployment time. When the deployment controller 130 includes parallel processing, the deployment controller 130 may start one or more worker threads in a worker pool 136. The worker pool 136 represents the worker threads available for deploying the container 121. In other words, the worker threads in the worker pool 136 are available for deploying the artifacts 123 of the container 121. The deployment engine 134 may place artifacts 123 ready for immediate deployment (meaning any artifacts 123 not waiting on a dependency to be deployed) on the work queue 127. The worker threads in worker pool 136 may pull an artifact from the work queue 127 and deploy that artifact, e.g., initiating generation of one or more database objects 143. When all artifacts 123 have been deployed (or the transaction has failed and rolled back), the deployment controller 130 may close the work threads.

The system also may include database 140. The database 140 may support a variety of conventional database object types, such as tables, views, indexes, etc., as well as non-conventional database object types, such as procedures, calculation views, synonyms, etc. In some implementations, the database 140 is an in-memory column-oriented database, such as HANA, where HANA supports both column-based and row-based storage. The database 140 may include various database processors 142, which can include a database processor that communicates with an optional deployment infrastructure proxy component, a structured query language ("SQL") processor, etc. In some implementations, the development environment client 110 may use the proxy component to access the deployment infrastructure 120.

In some implementations, the deployment controller 130 can communicate with the database processor 142 via an internal application programming interface (e.g., HANA's internal EAPI Thin Layer SQL client) on a new database transaction. This new transaction may not be related to the database transaction in which the deployment infrastructure command is sent to the database 140. The SQL communication from deployment infrastructure 120 towards the database process 140 can be a trusted communication, which can allow deployment infrastructure to execute SQL statements on behalf of different technical users inside a single database transaction in order to implement different security features at the database layer.

In some implementations, the system 100 can provide an SQL-based API for the deployment infrastructure 120 that can be accessed via a standard SQL connection, where the API can be exposed at the SQL layer. In some implementations, the system 100 may include a higher-level privileged container management API that allows the creation and deletion of schema-based containers and a container-level deployment API that allows applications and/or lifecycle management tools to deploy/un-deploy artifacts within a container. In some implementations, the system may keep the deployment controller 130 and the artifact conversion engine 124 isolated in its own operation system process.

In some implementations, the database 140 may include a proxy engine (not shown). The proxy engine may handle communications between the deployment controller 130 and the database processor 142. For the purposes of decoupling, the deployment infrastructure 120 can provide database procedures for its APIs. Communication from the database 140 towards the deployment infrastructure 120 can be provided via a proxy library that can be loaded into the database 140. This proxy can implement database procedures and/or client-side of a deployment infrastructure network protocol. All incoming requests can be routed to the deployment infrastructure process using this network protocol.

In some implementations, the deployment infrastructure can be constrained by at least one of the following deployment architectural boundaries: database services, application programming interfaces, and technical users. For example, some database services may not allow access to database objects 143 by other schema. As another example, some technical users may not be granted access while others may be granted access to a schema 141. The database processor 142 may check these deploy-time conditions and issue an error if an attempt is made to violate a deployment boundary. In some implementations, the deployment infrastructure 120 may create the required metadata, database users, and/or database roles inside the database 140 to support the database service instance.

Although illustrated in FIG. 1 as separate from the database 140, in some implementations, the deployment infrastructure 120 can also be included in the database 140 or included in a database cluster that also includes the database 140.

In an example implementation, design-time artifacts 113 uploaded from development environment 110 to the deployment infrastructure 120 (and placed as artifacts 123 to container 121 in deployment infrastructure 120) may be in the form of files. Accordingly, for convenience in description, artifacts 113 and artifacts 123 may be referred to hereinafter as "design-time files," "artifact files," or simply "files"). Each artifact file may include specifications or definitions for one or more data objects (e.g., DB objects 143) that corresponding artifact-type specific build plugins (e.g., artifact conversion engine 124) can deploy, undeploy, or redeploy in database 140. For convenience in description, each artifact file including specifications or definitions of database objects may be described herein as "including the database objects" for which the file has specifications or descriptions.

As shown for example in FIG. 1, deployment infrastructure 120 may include a table or a working directory (e.g., artifacts directory 129) listing the artifact files placed in container 121 along with information on the deployment status of the artifact files. Artifacts directory 129 may only be changed or updated by deployment infrastructure 120 during file deployment and undeployment processes.

Figure 2:
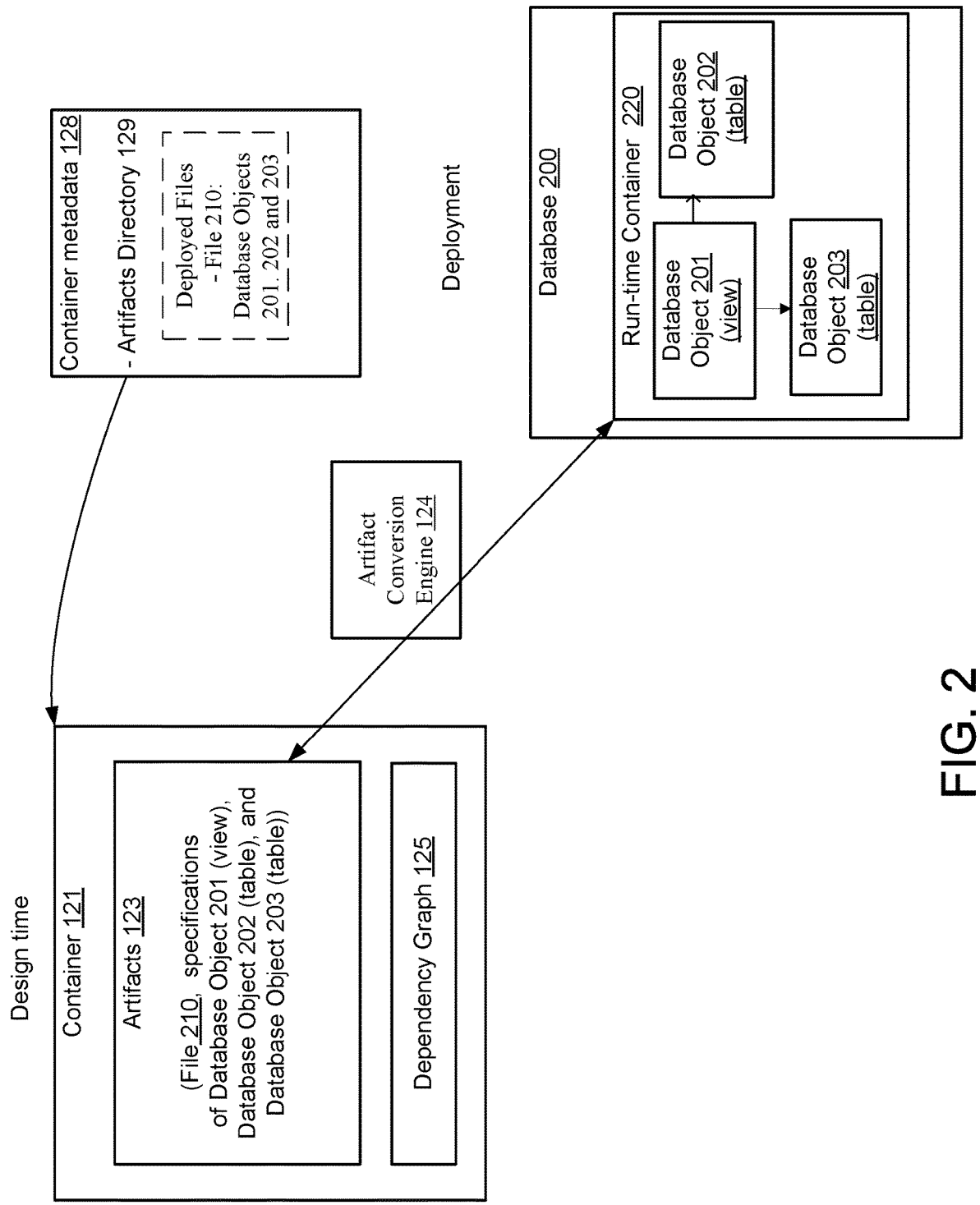
FIG. 2 is a schematic diagram illustrating deployment of an example design-time artifact file as a set of run-time database objects in a runtime container of a database, in accordance with the principles of the present disclosure.

FIG. 2 schematically shows deployment of an example artifact file (e.g., file 210 placed in container 121) into a set of run-time database objects in a runtime container 220 of a database 200. File 210 may, for example, include definitions or specifications for three run-time database objects (i.e., database object 201, database object 202 and database object 203). File 210 may be uploaded (e.g., a developer or database administrator) to deployment infrastructure 120 and placed in deployment infrastructure container 121 for deployment in container 220 of database 200. Build plugins/ artifact conversion engine 124 of deployment infrastructure 120 may process file 210 (e.g., in conjunction with dependency graph 125, as discussed above with reference to FIG. 1) to create deployed objects (i.e., database object 201, database object 202, and database object 203) in run-time container 220 of database 200 based on the specifications of the three run-time database objects in file 210.

With the deployment of database object 201, database object 202, and database object 203 by build plugins/artifact conversion engine 124, container metadata 128 generated by deployment infrastructure 120 may be updated to identify file 210 as a design-time resource that has been deployed and which supports deployed database object 201, database object 202, and database object 203 in database 200.

At a later time, file 210 may be undeployed by a user (e.g., using build plugins/artifact conversion engine 124). In which case, database object 201, database object 202, and database object 203 would be dropped from database 200 and container metadata 128 updated to indicate that file 210 is no longer a design-time resource that is deployed.

In the example of FIG. 2, file 210 may be considered to have ownership of the database objects (i.e., database object 201, database object 202, and database object 203) specified in the file so that when file 210 is deployed the specified database objects are created in the database, and when file 210 is undeployed, the specified database objects are deleted or dropped from the database.

Deployment infrastructure 120 may track artifact files (e.g., file 210) that are uploaded from development environment 110 and placed in container 121 for deployment of the database objects specified in the artifact files. The artifact files tracked may include artifact files that are newly placed in container 121 for new deployments and artifact files that are already in use to support currently deployed database objects in database 140. In an example implementation, deployment infrastructure 120 may generate container metadata (e.g., container metadata 128) with information regarding the artifact files that are placed in container 121. Container metadata 128 may, for example, reference a table or a working directory (e.g., artifacts directory 129) listing the artifact files placed in container 121 and include information regarding the deployment status and ownership of the database objects specified by the artifact files.

In an example implementation of deployment infrastructure 120, ownership may be declared as follows: A design-time artifact ("file") provides/owns the run-time database objects specified in the file; when the file is deployed, the specified run-time database objects are created in the database; when the file is undeployed, the specified run-time database objects are deleted or dropped from the database.

This declaration of ownership of the specified run-time database objects by the design-time artifact or file extends to, or implies, ownership of dependencies of the specified run-time database objects by the design-time artifact or file. The design-time artifact or file may require use of run-time database objects of other files (in other words, have a dependency on the run-time database objects specified in the other files). As discussed above with reference to FIG. 1, before, the design-time artifact or file can be properly deployed, all other files providing the required run-time database objects (i.e., dependencies) need to be already deployed.

Figure 3:
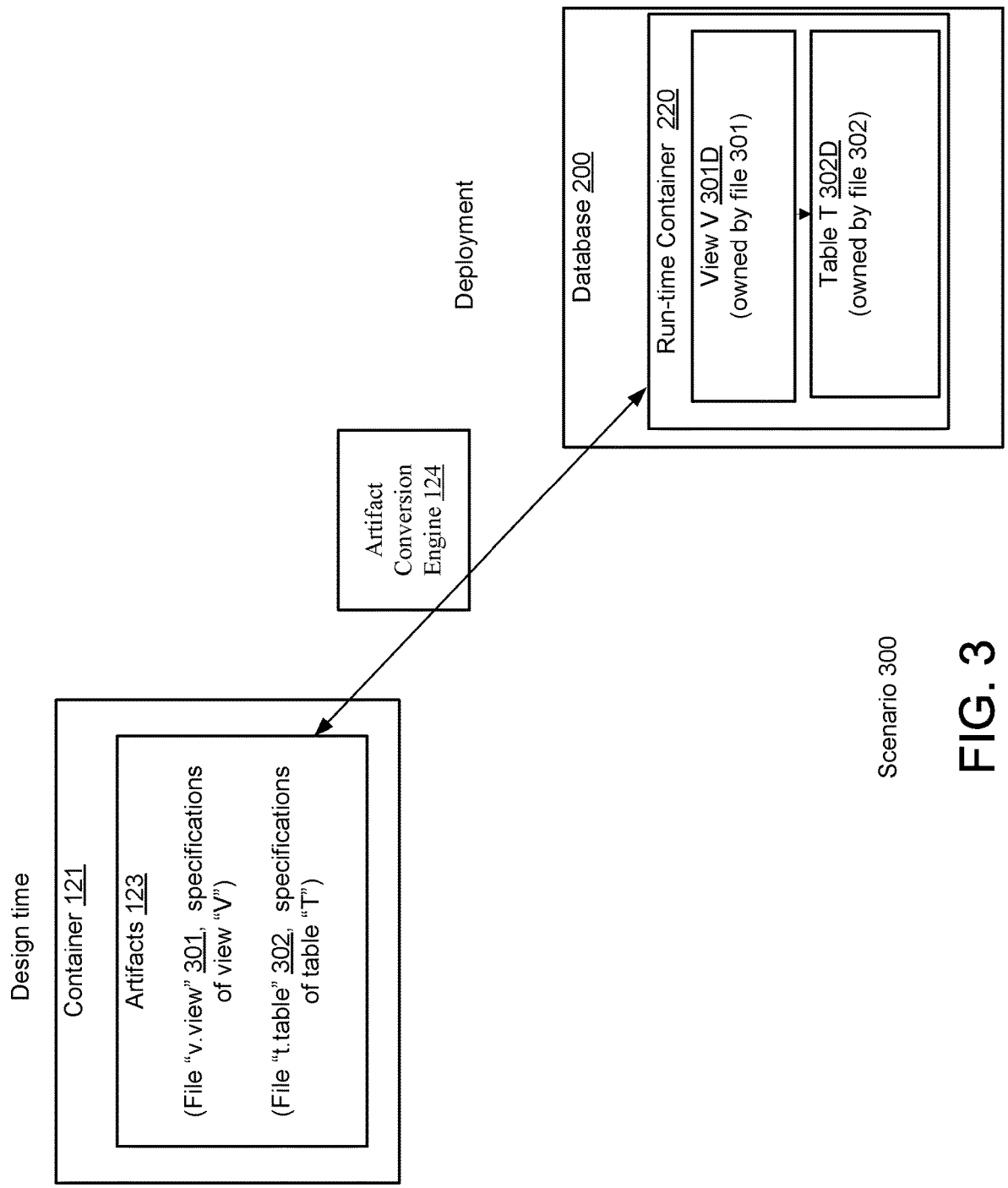
FIG. 3 is a schematic diagram illustrating a concept of ownership of database objects in an example file dependency scenario, in accordance with the principles of the present disclosure.

FIG. 3 is a schematic diagram illustrating a concept of ownership of database objects in an example file dependency scenario 300, in accordance with the principles of the present disclosure.

In scenario 300, artifacts 132 in container 121 may, for example, include a design-time file "t.table" 302 that may provide a run-time database table "T" 302D (in run time container 220 of database 220). Further, a design-time file "v.view" 301 may provide a database view "V" 301D, which selects data from run-time database table T 302D. File t.table 302 and file v.view 301 have ownership of run-time database objects table T 302D and view V 301D, respectively. However, since view V 301D selects data from database table T 302D, design-time file v.view 301 requires or depends on run-time database table T 302D. Based on this requirement or dependence, deployment infrastructure 120/artifact conversion engine 124 would first deploy file t.table 302 and then deploy file v.view 301 to create run-time database objects table T 302D and view V 301D in sequence (e.g., using dependency engine 132 in conjunction with dependency graph 125 shown, for example, in FIG.1).

As discussed above with reference to FIG. 1, in some implementations, some database objects may be specified in a design-time artifact file in a schema-free way, or in other words, without explicit schema references. The database objects may be deployed by any user who has the privilege to call a specific HANA DI SQL API function of a desired container (e.g., container 121) for deploying design-time artifacts. The user may directly edit a design-time artifact file to add or remove one or more database objects specified in a file, or move a database object from one file to another file.

In addition to direct file editing processes, there can be other processes (e.g., refactoring processes) available in deployment infrastructure 120 that can change the database objects specified in a file (i.e., refactor a file). Such refactoring processes may, for example, include renaming the file or the directory containing the file (e.g., artifacts directory 129, FIG. 2), moving a directory file including a set of database objects to another directory or subdirectory, merging different directory files including respective sets of database objects into a single directory file, and splitting a directory file including a set of database objects into multiple directory files including respective subsets of the database objects. As a consequence of the file editing or refactoring processes, a "refactored" file may have owner ship of a different set of run-time database objects than the set of run-time database objects specified in, and owned by, an "original" file (that has not been edited or refactored).

When a deployed file is refactored, the change in ownership of deployed database objects can complicate management of run-time database objects, lead to loss of state (i.e., data stored in a database object) and degrade performance.

Figure 4:
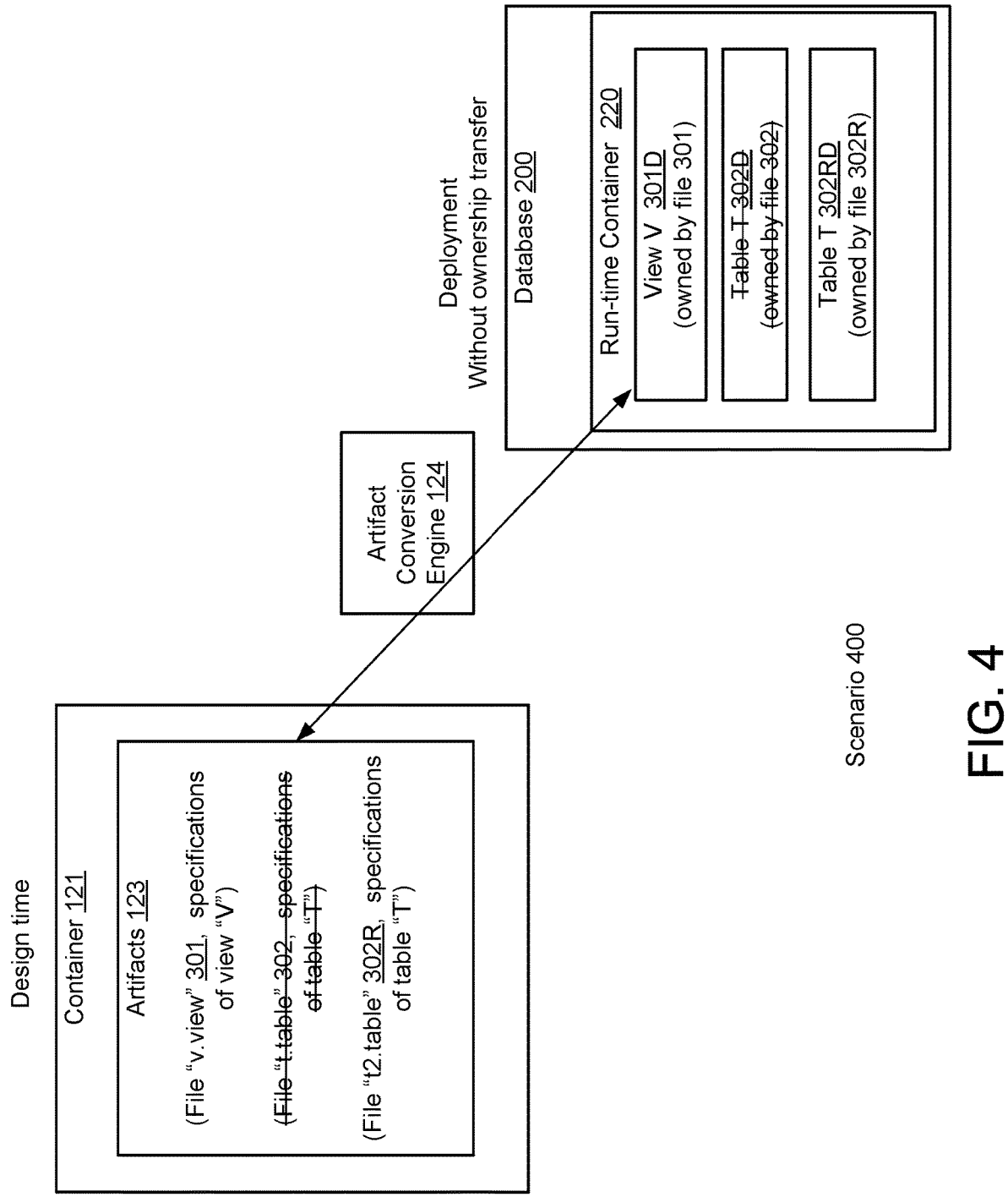
FIG. 4 is a schematic diagram illustrating how change in ownership of deployed database objects can complicate management of run-time database objects, lead to a loss of state and degrade performance in an example scenario, in accordance with the principles of the present disclosure.

FIG. 4 is a schematic diagram illustrating how change in ownership of deployed database objects when refactored files are put up for deployment in an example scenario can complicate management of run-time database objects, lead to a loss of state and degrade performance, in accordance with the principles of the present disclosure.

FIG. 4 shows, for example, a modified scenario 400 (based on scenario 300 of FIG. 3) in which a new or refactored file "t2.table" 302R also provides table T (i.e., also owns database table T). As shown in FIG. 4, replacing deployed file t.table 302 in container 121 by the refactored file t2.table 302R for deployment would lead to undeployment of file t.table 302 and consequent deletion or dropping of deployed table T 302D owned by file 302 from the database. If deployed table T 302D owned by file 302 has state (i.e., stored data in it) such state would be lost. Performance would be degraded because deploying refactored file t2.table 302R would further create a new deployed table T 302RD owned by file 302R with no state. Performance would also be degraded because, additionally, view V301D, which selects data from Table T, may have to be redeployed so that it properly addresses the newly deployed table T 302RD instead of the deleted or dropped table T 302D to select data therefrom.

In accordance with the principles of the present disclosure, such loss of state may be avoided by configuring deployment infrastructure 120 to keep, instead of dropping, the database object having state and automatically transfer ownership of the existing database object from the original file (providing the existing database object) to the refactored file.

Deployment infrastructure 120 may use tracking information regarding the artifact files that are placed in container 121 (e.g., information available in container meta data 128) in file deployment and undeployment processes to determine which existing database objects to delete or drop and which new database objects to create, when a refactored file is put for deployment in container 141. Deployment infrastructure 120 may identify database objects and dependencies of a refactored file that already exist in the database and transfer ownership of these existing database objects and dependencies from the original files (that support or provide these existing database objects and dependencies) to the refactored file. For deployment and undeployment processes, artifact conversion engine 124 may be configured not to undeploy an existing database object (provided by an original file) if a corresponding object is to be provided by the refactored file. Artifact conversion engine 124 may simply transfer ownership of the existing database object (provided by the original file) to the refactored file. Further, artifact conversion engine 124 may be configured not to create or deploy a database object specified in the refactored file anew if a corresponding database object is already provided for by another file.

Figure 5:
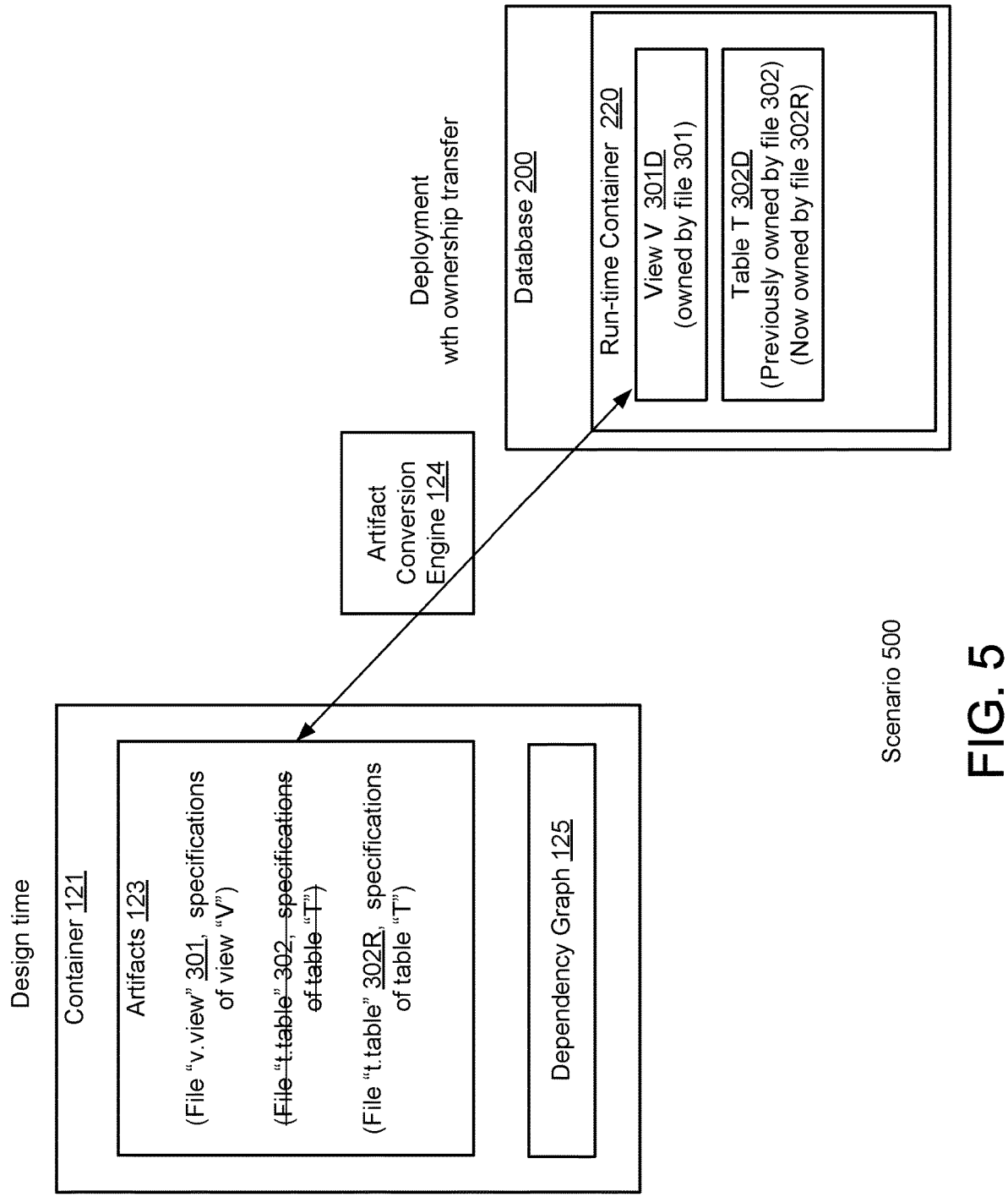
FIG. 5 is a schematic diagram illustrating how transfer of ownership of deployed database objects from an original file to a refactored file can avoid loss of state and improve performance in the example scenario of FIG. 4, in accordance with the principles of the present disclosure.

FIG. 5 is a schematic diagram showing how transfer of ownership of deployed database objects from an original file to a refactored file can avoid loss of state in the example scenario 400 of FIG. 4, in accordance with the principles of the present disclosure.

As shown in FIG. 5, deployment infrastructure 120 may be configured not to drop or delete existing database objects (e.g., deployed table T 302D) owned by original files (e.g., file 302) from the database when undeploying the original files, but to instead transfer ownership of the existing database objects from the original files (e.g., file 302) to the refactored files (e.g., file t2.table 302R) put up for deployment in container 121. Deployment infrastructure 120 may also be configured not to create new or duplicate database objects (e.g., table T 302RD) as the refactored files (e.g., file t2.table 302R) put up for deployment now own the previously deployed corresponding database objects (e.g., deployed table T 302D) owned by the original files. Thus, deployed table T 302D, which may have state, is not dropped from the database, but is reused with state in the deployment of the refactored files (e.g., file t2.table 302R).

Figure 6:
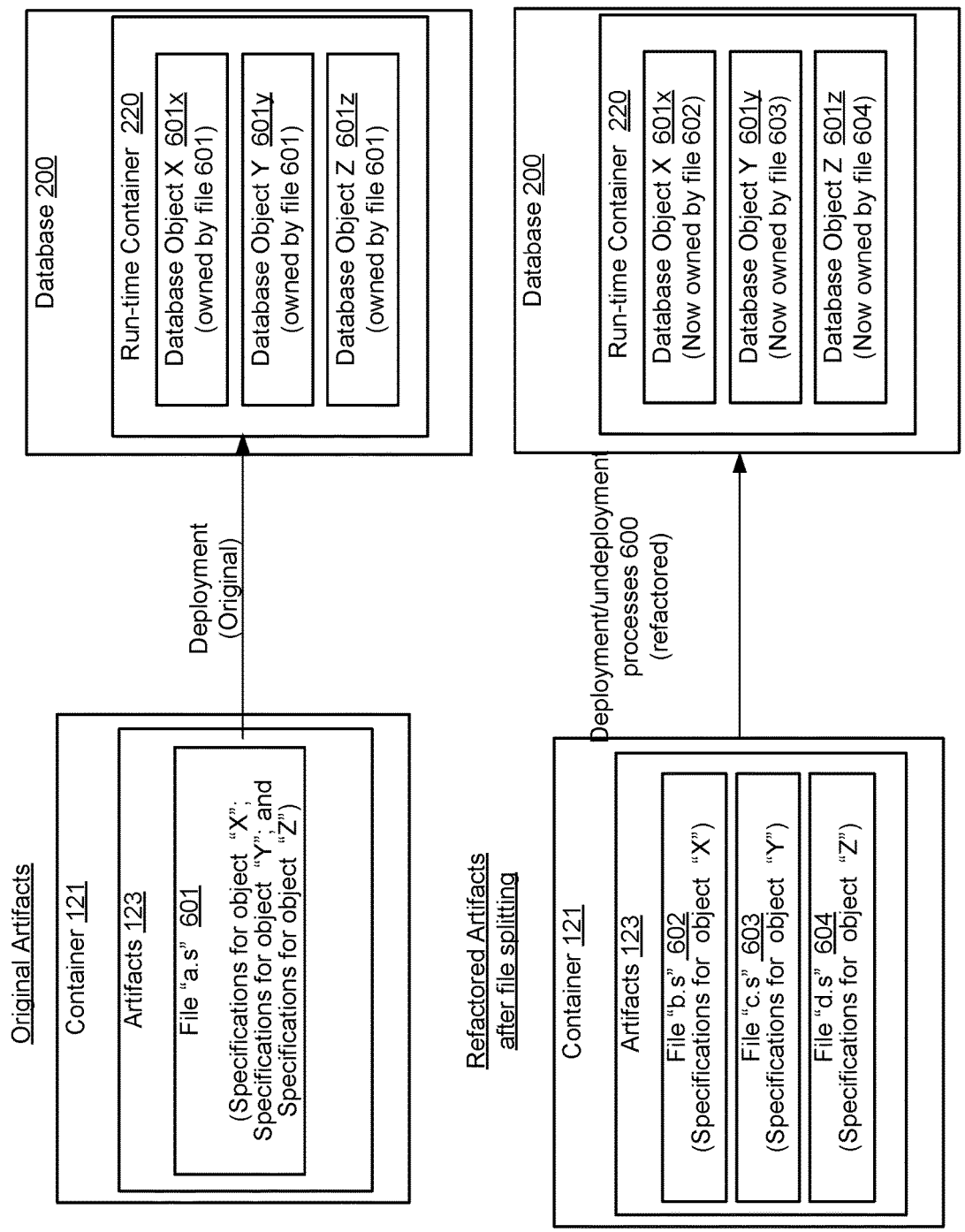
FIG. 6 schematically illustrates an example file deployment/undeployment process involving transfer of ownership of database objects "X," "Y", and "Z" of an original file to three refactored files in a file splitting scenario, in accordance with the principles of the present disclosure.

FIG. 6 schematically shows a deployment/undeployment process 600 involving transfer of ownership of database objects "X," "Y", and "Z" of an original file in a file splitting scenario, in accordance with the principles of the present disclosure.

In the file splitting scenario, an original file a.s 601 may include specifications for each of database objects X, Y, and Z. As shown in the upper half of FIG. 6, original file a.s 601 when placed for deployment in container 121 of development infrastructure 140 may result in database object X 601x, database object Y 602y and database object Z 601z being created in runtime container 220 of database 200. All three database objects—database object X 601x, database object Y 602y and database object Z 601z—would be owned by file 601.

In a file splitting or refactoring process, file 601 may be split into three files (i.e., file b.s 602 including specifications for database object X, file c.s 603 including specifications for database object Y, and file d.s 604 including specifications for database object Z). The three split files may be placed in container 121 (e.g., replacing original file a.s 601) for deployment. This may result in undeployment/deployment processes for undeploying original file a.s 601 and deploying the three split files (i.e., file b.s 602, file c.s 603, and file d.s 604).

In a traditional approach, undeploying original file a.s. 601 would lead to the existing objects provided by it (i.e. database object X 601x, database object Y 602y and database object Z 601z) being dropped from database 200 and deploying the three split files would lead to creation of objects X, Y, and Z anew. However, using deployment and undeployment processes based on the concept of ownership described herein, it is not be necessary to drop database object X 601x, database object Y 602y, and database object Z 601z from database 200 when undeploying original file a.s. 601, or to create new database objects when deploying the three split files (i.e., file b.s 602, file c.s 603, and file d.s 604). As shown in the bottom half of FIG. 6, deployment/undeployment process 600 (for undeploying original file a.s. 601 and deploying the three split files) instead of dropping the existing database objects (i.e., database object X 601x, database object Y 602y and database object Z 601z) provided by original file a.s. 601 merely transfers ownership of these objects to the three split files (i.e., file b.s 602, file c.s 603, and file d.s 604, respectively).

Figure 7:
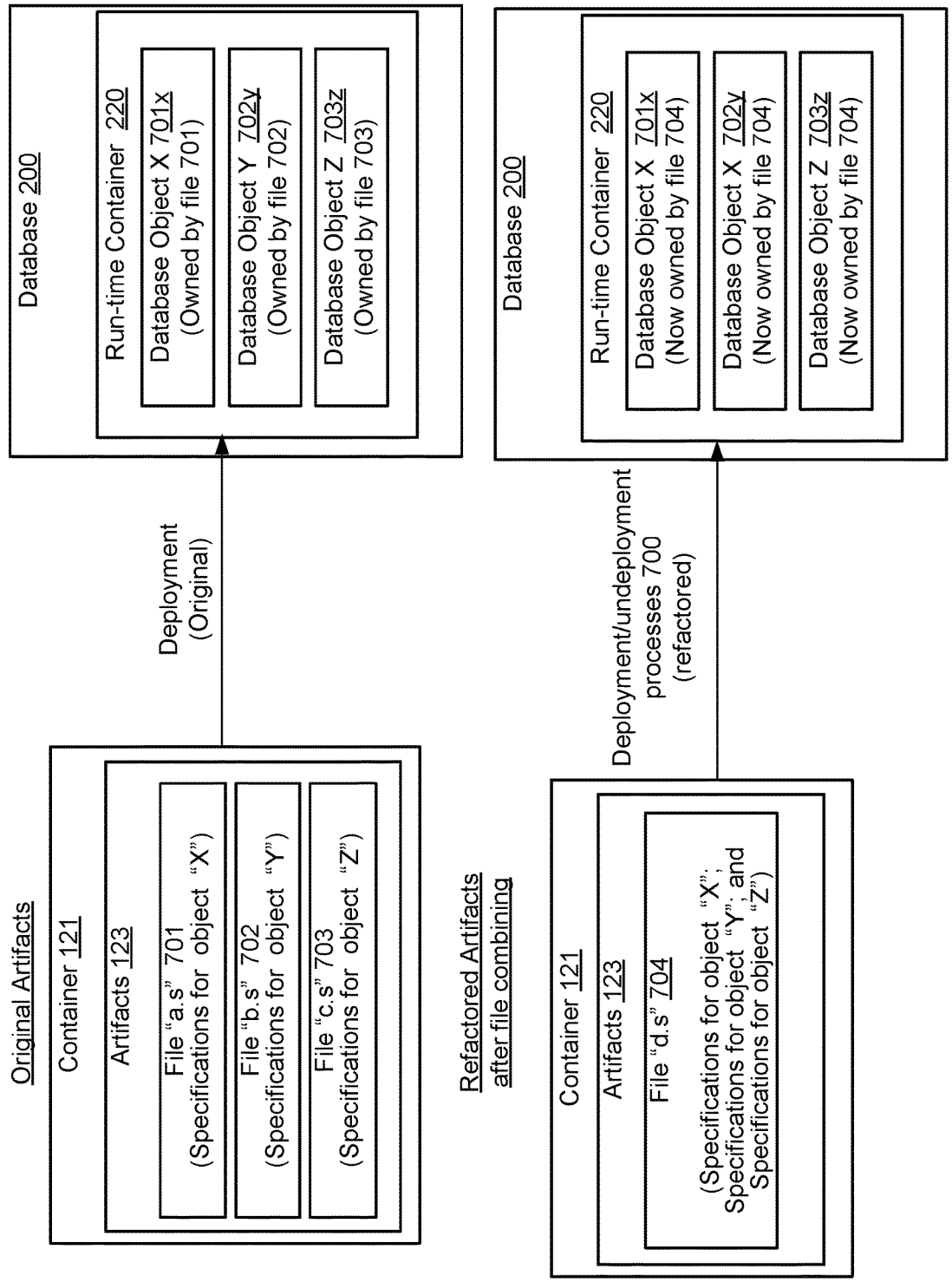
FIG. 7 schematically illustrates an example file deployment/undeployment process involving transfer of ownership of database objects "X," "Y", and "Z" of three original files, respectively, to single refactored file in a file joining or combining scenario, in accordance with the principles of the present disclosure.

FIG. 7 schematically illustrates an example file deployment/undeployment process involving transfer of ownership of database objects "X," "Y", and "Z" of three original files, respectively, to a single refactored file in a file combining scenario, which may be a converse of the file splitting scenario described above with reference to FIG. 6, in accordance with the principles of the present disclosure.

In the file combining scenario, three files (i.e., original file a.s 701, original file b.s 702, and file c.s 703) may include specifications for database object X, specifications for database object Y, and specifications for database object Z, respectively.

As shown in the upper half of FIG. 6, the three original files (i.e., original file a.s 701, original file b.s 702, and original file c.s 703) when placed for deployment in container 121 of development infrastructure 140 may result in database object X 701x, database object Y 702y and database object Z 701z being created in runtime container 220 of database 200. The three database objects (i.e., database object X 701x, database object Y 702y and database object Z 701z would be owned by file 701, file 702 and file 703, respectively.

In a file combining refactoring process, original file a.s 701, original file b.s 702, and original file c.s 703 may be combined into a single refactored file (i.e., file d.s 704), which includes specifications for all three database objects (i.e., database object X, database object Y, and for database object Z). The combined file d.s 704 may be placed in container 121 (e.g., replacing original file a.s 701, original file b.s 702, and original file c.s 703) for deployment. This may result in undeployment/deployment processes 700 for undeploying the three original files (i.e., original file a.s 701, original file b.s 702, and original file c.s 703) and deploying the combined file d.s 704.

In a traditional approach, undeploying the original files (i.e., original file a.s 701, original file b.s 702, and original file c.s 703) would lead to the existing objects provided by them (i.e., database object X 701x, database object Y 702y, and database object Z 701z, respectively) being dropped from database 200, and deploying the combined file d.s 704 would lead to creation of objects X, Y, and Z anew. However, using deployment and undeployment processes 700 based on the concept of ownership described herein, it is not necessary to drop database object X 601x, database object Y 602y, and database object Z 601z from database 200 when undeploying the original files (i.e., original file a.s 701, original file b.s 702, and original file c.s 703), or to create new database objects when deploying the combined file d.s 704. As shown in the bottom half of FIG. 6, deployment/undeployment process 700 (for undeploying the original files and deploying the combined file instead of dropping the existing database objects (i.e., database object X 701x, database object Y 702y and database object Z 701z) provided by the original files merely transfers ownership of these objects to the combined file (i.e., file d.s 704).

FIG. 8 is a flow chart illustrating an example computer-implemented method 800 for deploying a new artifact file in a database, in accordance with the principles of the present disclosure. The new artifact file may provide specifications for one or more new run-time database objects to be created in the database by processing of the new artifact file by artifact-type specific conversion engines (e.g., artifact conversion engine 124) when the new artifact . file is placed, for example, in container 121 or deployment infrastructure 120.

Method 800 for deploying a new artifact file in a database includes assigning ownership of the one or more new run-time database objects to be created in the database to the new artifact file (810), and when an existing database object in the database provided by another artifact file corresponds to a new run-time database object specified in the new artifact file, assigning ownership of the existing database object in the database to the new artifact file being deployed (820).

Method 800 further includes, when processing of the new artifact file by artifact-type specific conversion engines to create one or more new run-time database objects in the database, excluding creation a new run-time database object corresponding to the existing database object whose ownership is now assigned to the new artifact file being deployed (830).

Method 800 can also include undeploying the another artifact file by dropping one or more existing database objects in the database provided by the another artifact file but keeping the existing database object whose ownership is now assigned to the new artifact file being deployed (840). The existing database object whose ownership is now assigned to the new artifact file may be a database object having state.

Method 800 or a variation of it may be used in the case where the new artifact file provides specifications for a new run-time database object having a dependency. The dependency may be the existing database object provided by the another artifact file. Assigning ownership of the one or more new run-time database objects to be created in the database to the new artifact file 820 may include recognition, by the new artifact file, of the dependency corresponding to the existing database object provided by the another artifact file.

The new artifact file (deployed by method 800) may, for example, be a result of refactoring of other artifact files. Refactoring of other artifact files may include one or more of: renaming a file or a directory containing the file; moving a file from one directory to a second directory; combining database object specifications from different files into a single file; splitting a single file containing multiple database objects specification into different files; and moving database objects specification between files. Method 800 may include tracking dependencies provided by the other artifact files as extracted from the other artifact files by the artifact-type specific conversion engines.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, including:
deploying a new artifact file in a deployment infrastructure container associated with a database, wherein the deployment infrastructure container is separate from the database, the new artifact file providing specifications for one or more new run-time database objects to be created in the database by processing of the new artifact file, including:
processing the new artifact file to create the one or more new run-time database objects;
assigning ownership of the one or more new run-time database objects in the database to the new artifact file, wherein ownership signifies that the new run-time database objects are to be deployed when owned, and deleted or dropped when not owned; and
in response to an existing database object in the database provided by another artifact file corresponding to a new run-time database object specified in the new artifact file, transferring ownership of the existing database object in the database from the another artifact file to the new artifact file being deployed instead of undeploying the existing database object, wherein the another artifact file has been deployed, and wherein the new artifact file is being deployed.

2. The computer-implemented method of claim 1, wherein processing of the new artifact file to create one or more new run-time database objects in the database excludes creating a new run-time database object corresponding to the existing database object whose ownership is now assigned to the new artifact file being deployed.

3. The computer-implemented method of claim 1 further comprising undeploying the another artifact file by dropping one or more existing database objects in the database provided by the another artifact file but keeping the existing database object whose ownership is now assigned to the new artifact file being deployed.

4. The computer-implemented method of claim 3, wherein the existing database object whose ownership is now assigned to the new artifact file is a database object having state.

5. The computer-implemented method of claim 1, wherein the new artifact file provides specifications for a new run-time database object having a dependency, the dependency corresponding to the existing database object provided by the another artifact file, and wherein assigning ownership of the one or more new run-time database objects to be created in the database to the new artifact file includes recognition, by the new artifact file, of the dependency corresponding to the existing database object provided by the another artifact file.

6. The computer-implemented method of claim 1, wherein the new artifact file is a result of refactoring of other artifact files, and wherein the method includes tracking dependencies provided by the other artifact files as extracted from the other artifact files.

7. The computer-implemented method of claim 1, wherein the refactoring of other artifact files includes one or more of: renaming a file; moving a file from one directory to a second directory; combining database object specifications from different files into a single file; splitting a single file containing multiple database objects specification into different files; and moving database objects specification between files.

8. A non-transitory computer readable storage medium having instructions stored thereon, including instructions which, when executed by a microprocessor, cause a computer system to:
deploy a new artifact file in a deployment infrastructure container associated with a database, wherein the deployment infrastructure container is separate from the database, the new artifact file providing specifications for one or more new run-time database objects to be created in the database by processing of the new artifact file, including:
  processing the new artifact file to create the one or more new run-time database objects;
  assigning ownership of the one or more new run-time database objects in the database to the new artifact file, wherein ownership signifies that the new run-time database objects are to be deployed when owned, and deleted or dropped when not owned; and
  in response to an existing database object in the database provided by another artifact file corresponding to a new run-time database object specified in the artifact file, transferring ownership of the existing database object in the database from the another artifact file to the new artifact file being deployed instead of undeploying the existing database object, wherein the another artifact file has been deployed, and wherein the new artifact file is being deployed.

9. The non-transitory computer readable storage medium of claim 8, wherein processing of the new artifact file to create one or more new run- time database objects in the database excludes creating a new run-time database object corresponding to the existing database object whose ownership is now assigned to the new artifact file being deployed.

10. The non-transitory computer readable storage medium of claim 8, wherein the instructions which, when executed by the microprocessor, further cause the computer system to undeploy the another artifact file by dropping one or more existing database objects in the database provided by the another artifact file but keeping the existing database object whose ownership is now assigned to the new artifact file being deployed.

11. The non-transitory computer readable storage medium of claim 8, wherein the existing database object whose ownership is now assigned to the new artifact file is a database object having state.

12. The non-transitory computer readable storage medium of claim 8, wherein the new artifact file provides specifications for a run-time database object having a dependency, the dependency corresponding to the existing database object provided by the another artifact file, and wherein assigning ownership of the one or more new run-time database objects to be created in the database to the new artifact file includes recognition, by the new artifact file, of the dependency corresponding to the existing database object provided by the another artifact file.

13. The non-transitory computer readable storage medium of claim 8, wherein the new artifact file is a result of refactoring of other artifact files, and wherein the instructions which, when executed by the microprocessor, further cause the computer system to track dependencies provided by the other artifact files as extracted from the other artifact files.

14. The non-transitory computer readable storage medium of claim 8, wherein the refactoring of other artifact files includes one or more of: renaming a file; moving a file from one directory to a second directory; combining database object specifications from different files into a single file; splitting a single file containing multiple database objects specification into different files; and moving database objects specification between files.

15. A database management system comprising:
  a database; and
  a computer system in which design-time artifact files are placed in a deployment infrastructure container for deployment to the database, each design-time artifact file providing specifications of one or more database objects to be created in the database, wherein the deployment infrastructure container is separate from the database, the computer system including a non-transitory computer readable storage medium and one or more processors;
  wherein the one or more processors are configured to process design-time artifact files to create run-time database objects in the database according to the specifications provided in the design-time artifact files, wherein the computer system is tracking the run-time database objects and their dependencies created in the database to determine which run-time database objects and which dependencies are provided by which artifact file; and
  wherein the computer system is configured to:
    in response to a new artifact file providing specifications for one or more new run-time database objects to be created in the database is placed in the container for deployment to the database, assign ownership of the one or more new run-time database objects to be created in the database to the new artifact file; and
    in response to an existing database object in the database provided by another artifact file corresponding responds to a new run-time database object specified in the new artifact file, transfer ownership of the existing database object in the database from the another artifact file to the new artifact file being deployed instead of undeploying the existing database object, wherein the another artifact file has been deployed, and wherein the new artifact file is being deployed.

16. The database management system of claim 15, wherein processing of the new artifact file to create one or more new run-time database objects in the database excludes creating a new run-time database object corresponding to the existing database object whose ownership is now assigned to the new artifact file being deployed.

17. The database management system of claim 15, wherein the computer system is configured to undeploy the another artifact file by dropping one or more existing database objects in the database provided by the another artifact file but keeping the existing database object whose ownership is now assigned to the new artifact file being deployed.

18. The database management system of claim 15, wherein the existing database object whose ownership is now assigned to the new artifact file is a database object having state.

19. The database management system of claim 15, wherein the new artifact file provides specifications for a run-time database object having a dependency, the dependency corresponding to the existing database object provided by the another artifact file, and wherein assigning ownership of the one or more run-time database objects to be created in the database to the new artifact file includes recognition, by the new artifact file, of the dependency corresponding to the existing database object provided by the another artifact file.

20. The database management system of claim 15, wherein the computer system includes file refactoring processes and wherein the new artifact file is a result of the refactoring processes including one or more of: renaming a file; moving a file from one directory to a second directory; combining database object specifications from different files into a single file; splitting a single file containing multiple database objects specification into different files; and moving database objects specification between files.

* * * * *